US006676327B2

(12) United States Patent
Baugh (10) Patent No.: US 6,676,327 B2
(45) Date of Patent: Jan. 13, 2004

(54) PIN CONNECTION FOR CLAMPING MEANS (76) Inventor: Benton F. Baugh, 14626 Oak Bend, Houston, TX (US) 77079

( * ) Notice: Subject to any disclaimer, the term of this patent is extended or adjusted under 35 U.S.C. 154(b) by 0 days.

(21) Appl. No.: 09/835,175

(22) Filed: Apr. 16, 2001

(65) Prior Publication Data

US 2002/0150420 A1 Oct. 17, 2002

(51) Int. Cl.⁷ .............................. F16B 1/04; G05G 5/00
(52) U.S. Cl. .................... 403/364; 403/31; 403/316; 403/322.1; 70/18
(58) Field of Search .................. 403/321, 322.1–322.3, 403/323, 324, 325, 326, 362, 364, 31, 315, 316, 319; 70/14, 18, 19, 32–34; 292/302; 285/197

(56) References Cited

U.S. PATENT DOCUMENTS

| | | | |
|---|---|---|---|
| 1,191,617 A | * | 7/1916 | Ruete |
| 2,048,208 A | | 7/1936 | Young et al. |
| 3,737,180 A | | 6/1973 | Hayes, Jr. et al. |
| 3,775,987 A | | 12/1973 | Rochelle et al. |
| 3,860,122 A | | 1/1975 | Cernosek |
| 4,202,653 A | | 5/1980 | Moller |
| 4,290,495 A | | 9/1981 | Elliston |
| 4,296,615 A | * | 10/1981 | Zoor ........................... 70/181 |
| 4,997,218 A | * | 3/1991 | Culling ...................... 292/302 |
| 5,024,303 A | * | 6/1991 | Kosloff ......................... 16/82 |
| 5,036,683 A | * | 8/1991 | Geuvjehizian .............. 292/302 |
| 5,136,890 A | * | 8/1992 | Hibi et al. |
| 5,255,542 A | * | 10/1993 | Fortin ........................ 292/302 |
| 5,421,675 A | | 6/1995 | Brown et al. |
| 5,544,506 A | * | 8/1996 | Nakano ...................... 292/302 |
| 5,603,588 A | | 2/1997 | Herbert |
| 5,931,231 A | * | 8/1999 | Mock |
| 6,237,445 B1 | * | 5/2001 | Wesch, Jr. |
| 6,276,729 B1 | * | 8/2001 | Sanwald et al. |

* cited by examiner

Primary Examiner—Lynne H. Browne
Assistant Examiner—Ryan M. Flandro (57) ABSTRACT A pin connection for remote releasably locking two sides of a connection together comprising multiple fingerlike projections from two opposing sides of the connection which contain locking pins of a length approximately equal to the width of the fingerlike projections and mounted in holes in the fingerlike projections, the locking pins being centrally located in the holes in the unlocked position and being across the interfaces between the fingerlike projections when locked.

12 Claims, 7 Drawing Sheets

PIN CONNECTION FOR CLAMPING MEANS

BACKGROUND OF THE INVENTION

1. Field of the Invention

This invention relates generally to assemblies which wrap around circular pipes and similar devices which require that the abutting ends be pinned together such that the pins will be in shear and will be benefited by multiple shear planes to carry the shear loads.

2. Description of the Related Art

Pipe support assemblies frequently referred to as slip assemblies are frequently hinged so that they can be engaged around pipe while it is supported from the top. The slips are segmented units which have sharp teeth in the inner surface to grab the pipe with a high friction coefficient and are characteristically tapered on the back (8° to 15° with respect to the centerline) so that they will be wedged against the pipeline. The slip segments fit within a bowl which has a corresponding inner taper. The bowls will be segmented in 2 to 4 pieces to allow the hinging around the pipe. The interface between the sections will normally remained pinned to allow flexibility, except for one interface. That interface will have alternating finger like projections from the edges of each of the slip bowl sections that mesh together when they are brought to adjacent positions.

On the edge of a bowl section, each of the fingerlike projections will have a hole, with the holes being on a common centerline. When the edges of two bowl sections are brought together and the fingerlike projections mesh, the holes on one edge will be aligned with the holes on the other section and allow a pin to be inserted into the aligned holes.

When the slip segments are loaded with a pipe section and cause an outward force due to the taper on the slip segments and bowl, the outward force is translated into a circumferential or hoop force in the bowl, causing a shear stress in the pin. The force is divided by the number of times the pin is put in shear in the construction.

In conditions involving larger pipe sizes and high loads, the diameter and length of the pin can cause the pin to be long and heavy. Large and long pin sizes promote the need for automation of operation of the insertion and removal of the pin. The need for remote operation of the pin such as in the mast of a rig or on the seafloor also promote the need for remote operation. The longer the pin, the longer the operating cylinder. Long cylinders complicate the design and add to system space considerations.

The present invention is directed to overcoming, or at least reducing the effects of one or more of the problems set forth above.

SUMMARY OF THE INVENTION

The object of this invention is to provide a pin connection which can be remotely operated.

A second object of this invention is to provide for remote or power operation of the pin, with a reduced space requirement.

A third object of this invention is to provide means for accurately aligning the ends of the pipelines for welding and laying.

Another object of this invention is to provide a pin connection which is failsafe to the closed or locked position.

Other objects and advantages of the invention will become apparent upon reading the following detailed description and upon referring to the drawings which follow.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
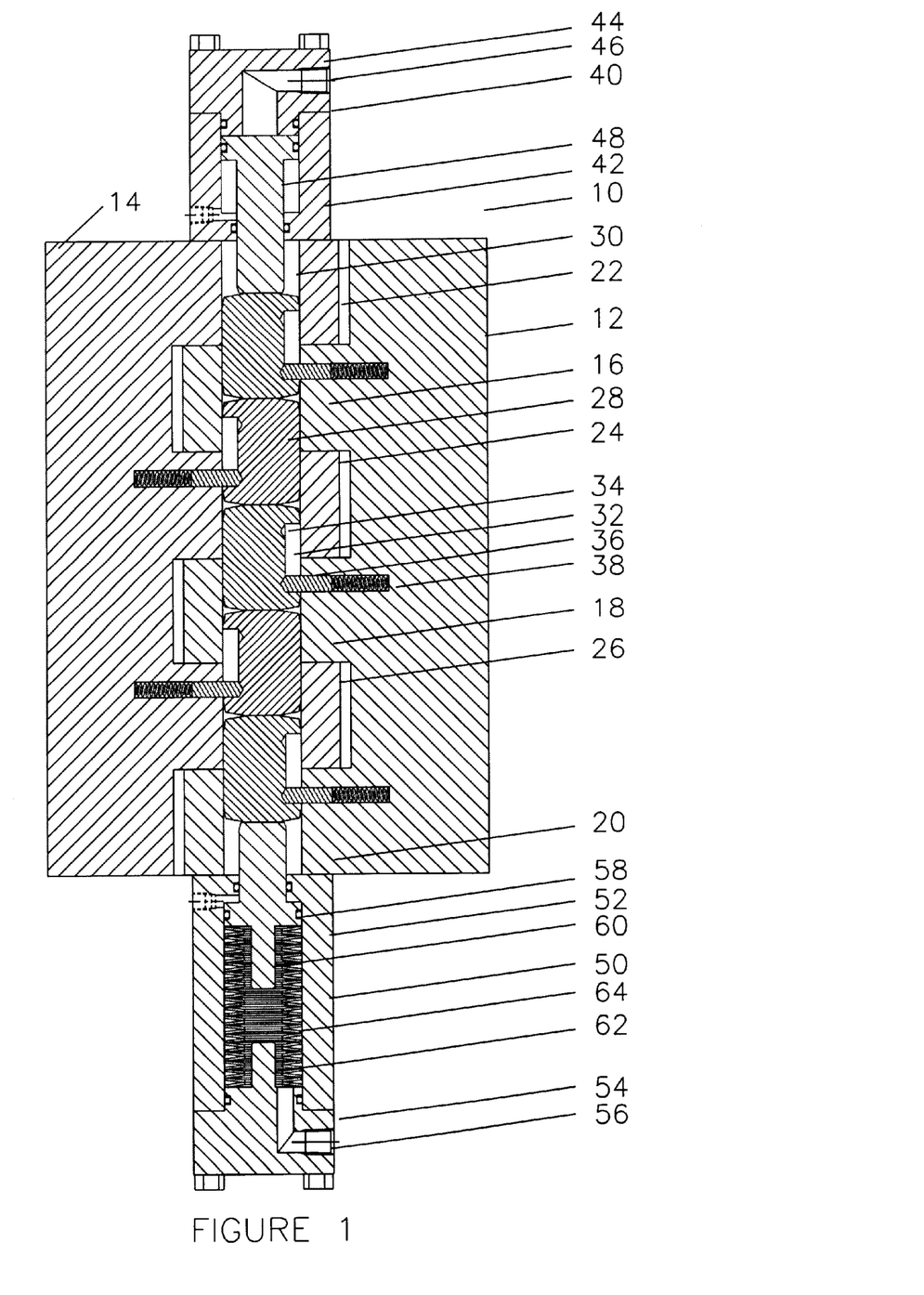
FIG. 1 shows a half section thru a preferred embodiment of the pin connection in the locked position.

Referring now to FIG. 1, pin connection 10 includes first bowl section 12 and second bowl section 14. Bowl section 12 has fingerlike projections 16, 18, and 20. Bowl section 14 has fingerlike projections 22, 24, and 26. A multiplicity of pin sections 28 extend thru holes 30 in the fingerlike projections.

Each pin section 28 has a slot 32 with a detent hole 34 in each end of the slot. A stop pin 36 is engaged in the detent hole 34 in one end of slot 32 and is urged into the hole by spring 38. In this manner, when a stop pin is engaged into a detent hole, the pin section tends to remain in place. Alternately, variations such as a simple circular detent groove can be used to both detent and stop the locking pin.

A release cylinder 40 includes a cylinder 42, a cap 44 with a threaded connection port 46, and a piston 48. When the release cylinder is pressured thru the port 46, the pin sections are moved from straddling the interfaces between the fingerlike projections to being between the interfaces.

A locking cylinder 50 includes a cylinder 52, a cap 54 with a threaded connection port 56, a piston 58, a piston extension 60, a cap extension 62, and a series of conical springs 64.

In this view, each of the five pin sections will be loaded in shear about their central sections if the two bowl sections are attempted to be pulled apart.

Figure 2:
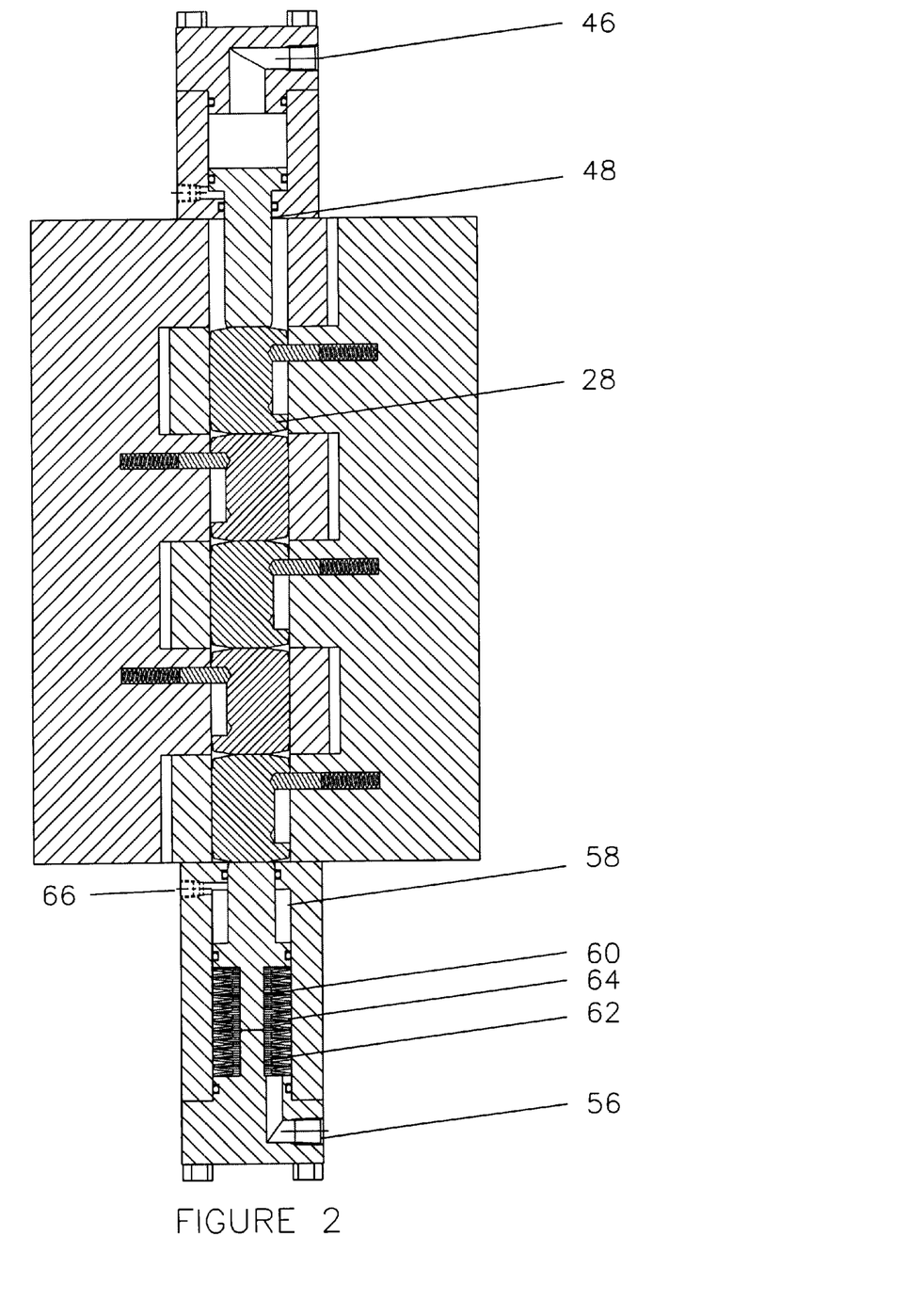
FIG. 2 shows a half section thru the pin connection in the unlocked position.

Referring now to FIG. 2, port 46 has been pressured and the fluid has been vented out port 56. Piston 48 has moved down, pushing all the pin sections 28 from their upper detented positions to their lower detented positions. Port 66 has also been pressured to move the piston 58 down until piston extension 60 contacts the cap extension 62. The pin connection is now unlocked.

Figure 3:
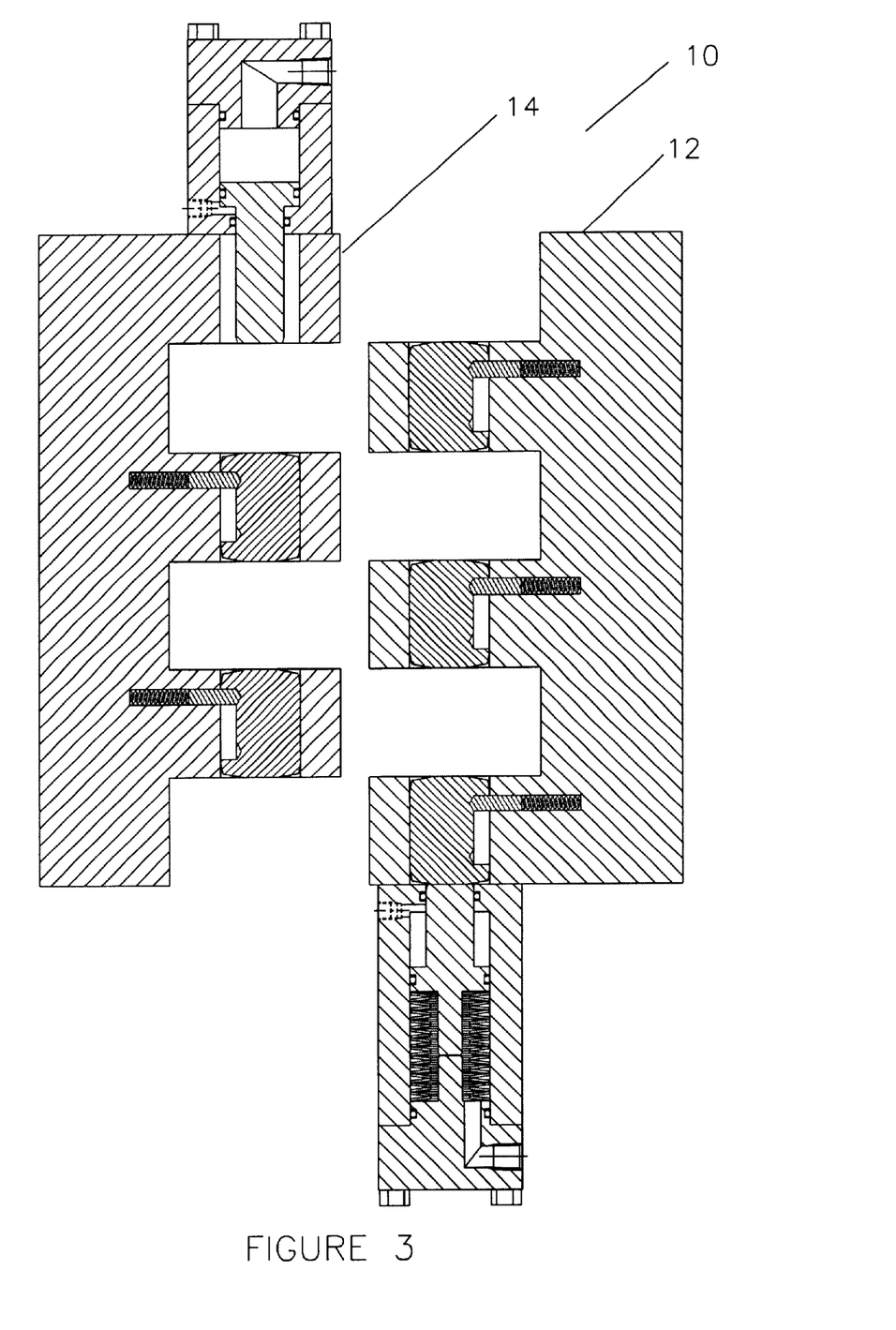
FIG. 3 shows a half section of the pin connection in the unlocked position with the bowl sections separated.

Referring now to FIG. 3, pin connection 10 is released as bowl section 12 is displaced away from bowl section 14.

Figure 4:
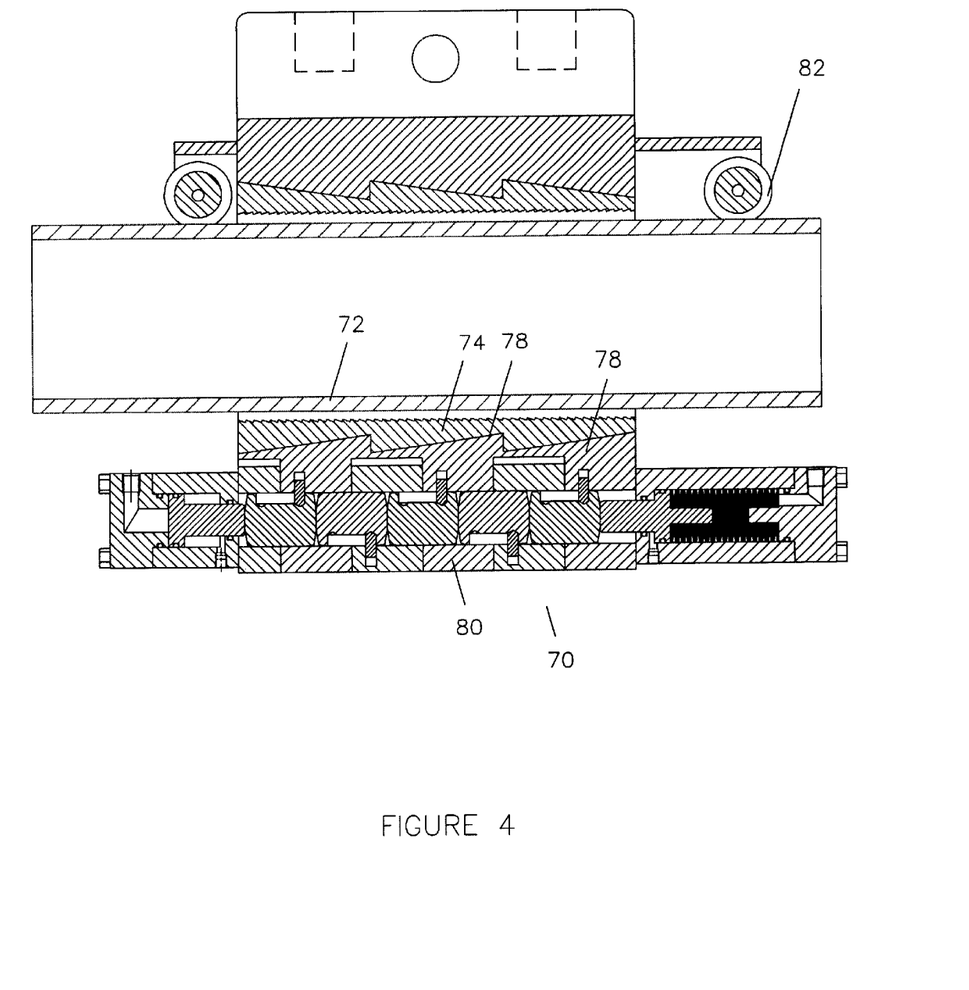
FIG. 4 shows a half section of a subsea clamp assembly which is designed to be engaged around a pipeline and then locked together.

Referring now to FIG. 4, clamp assembly 70 surrounds a subsea pipeline 72 and has slip segments 74. The slip segments have sharp teeth that engage the pipeline for pulling the pipeline in operations such as recovery of the pipeline to the surface. Slip bowl segments 76 surrounds the slip segments 74 and provides a tapered interface 78 between the two. Pin connection 80 provides for the releasable connection between two adjacent bowl sections. Rollers 82 provide for guiding the clamp assembly on the pipeline until the slip segments are set onto the pipeline.

Figure 5:
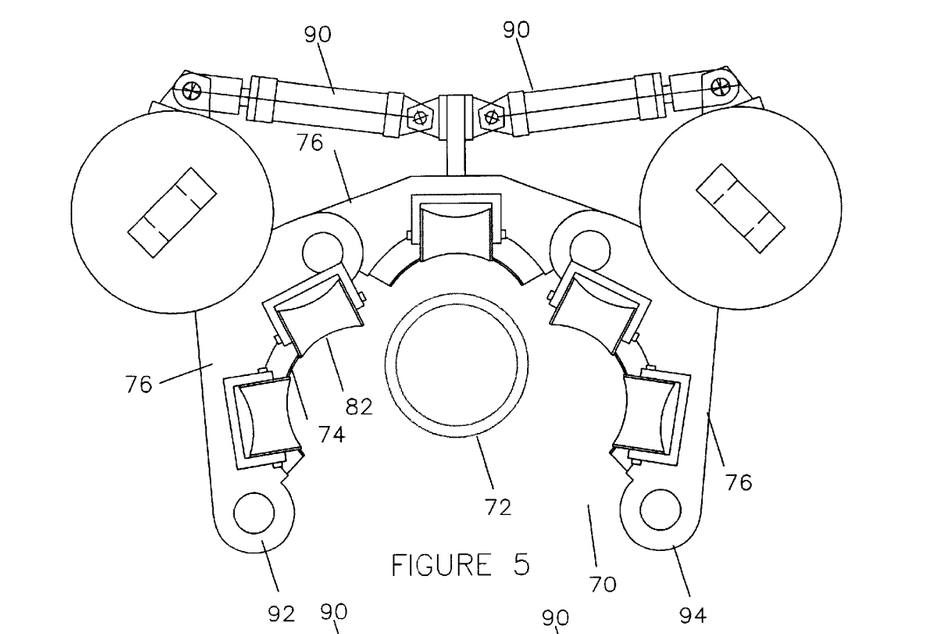
FIG. 5 shows an end view of the clamp of FIG. 4 being open and lowered onto a subsea pipeline.

Referring now to FIG. 5, cylinders 90 hold the bowl segments 76 in an open position to land over the pipeline 72, keeping the sections 92 and 94 of the connection 80 separated.

Figure 6:
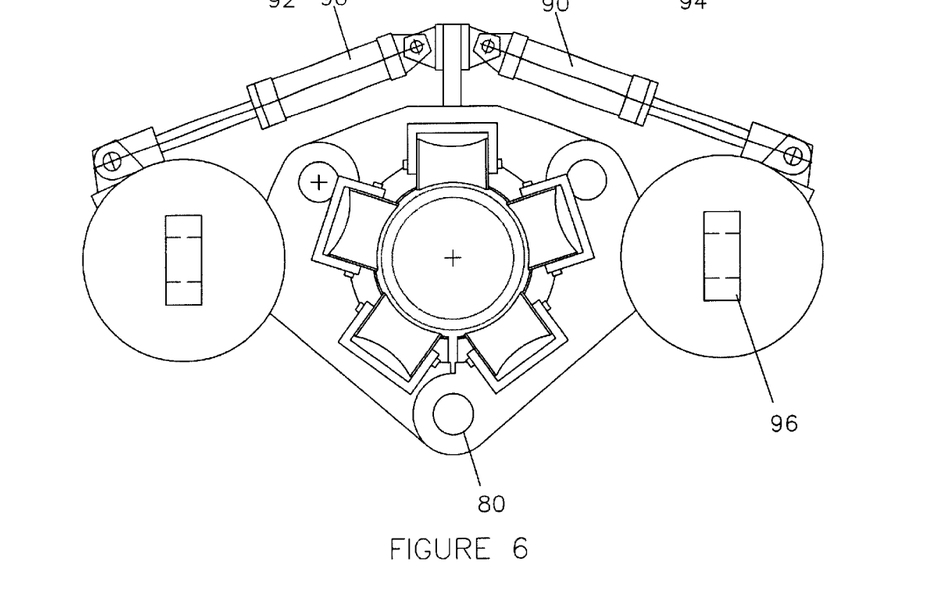
FIG. 6 shows the clamp of FIGS. 4 and 5 being engaged with the pipeline and locked in place.

Referring now to FIG. 6, the cylinders 90 have been extended to bring the sections 92 and 94 together to allow the pin connection 80 to be locked together. Padeyes 96 are provided for attachment of cables to pull the clamp assembly and therefore the pipeline.

Figure 7:
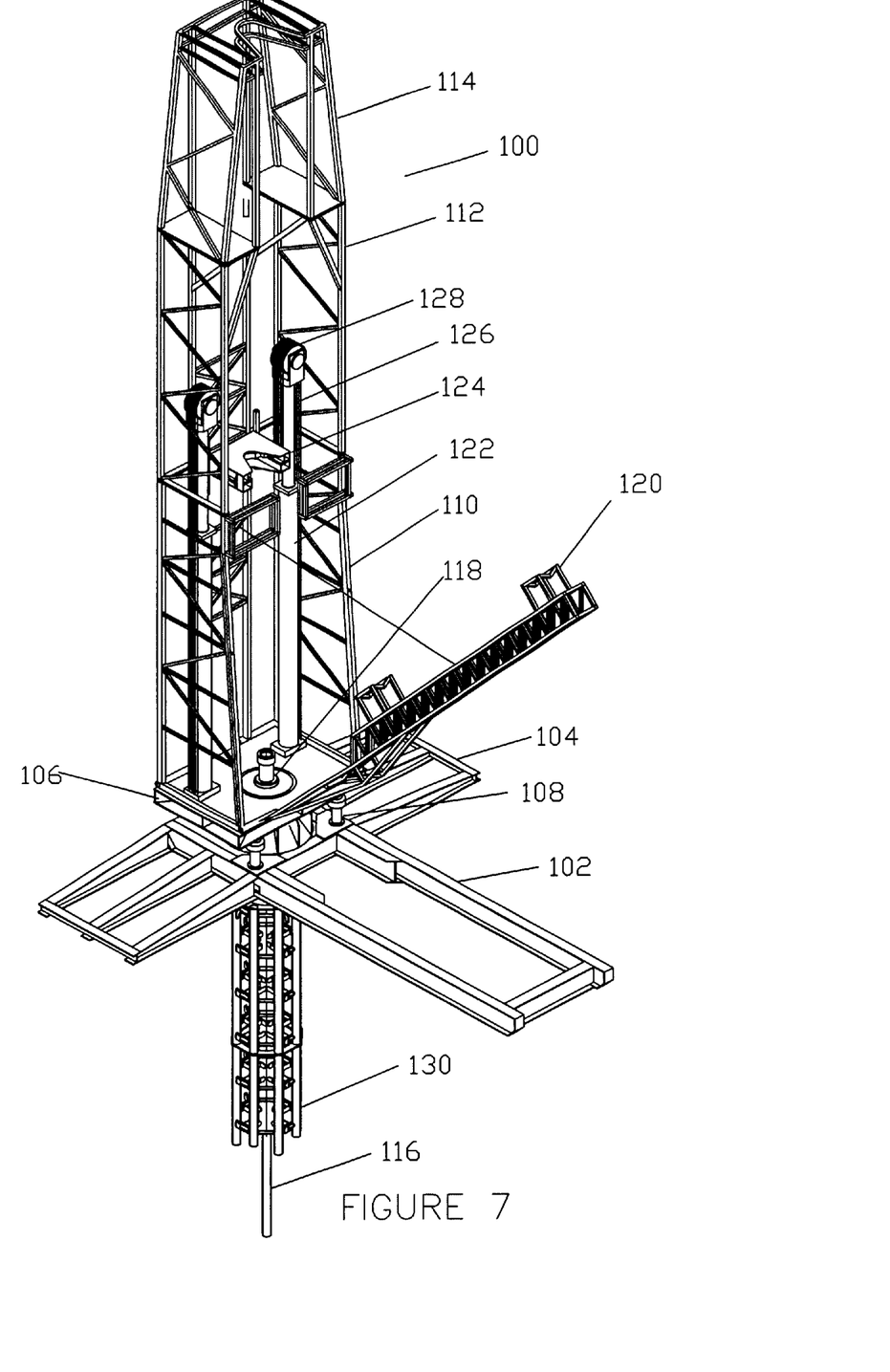
FIG. 7 shows an isometric view of a J-Lay Tower which has a travelling table with a clamp mechanism amenable to remote control.

Referring now to FIG. 7, a perspective view of a J-Lay pipeline tower 100 which is benefited by the application of the present invention. Base skid 102 is provided with extensions 104 to each side. A gimbaling stationary table 106 is supported on three adjustable jacks 108. Mast sections 110, 112, and 114 are supported off the stationary table 106. The upper portion 116 of the pipeline being supported on bushing 118 on the stationary table 106.

New pipe sections to be welded into the pipeline being laid by the system are brought up from the deck of the lay vessel by the erector 120 and engaged by the travelling table 124. The travelling table 124 is lifted by a pair of cylinders 122 with cables 126 over drums 128. The remote and moveable location of the travelling table 124 makes it beneficial to have connections in the travelling table operated by remote control.

Figure 8:
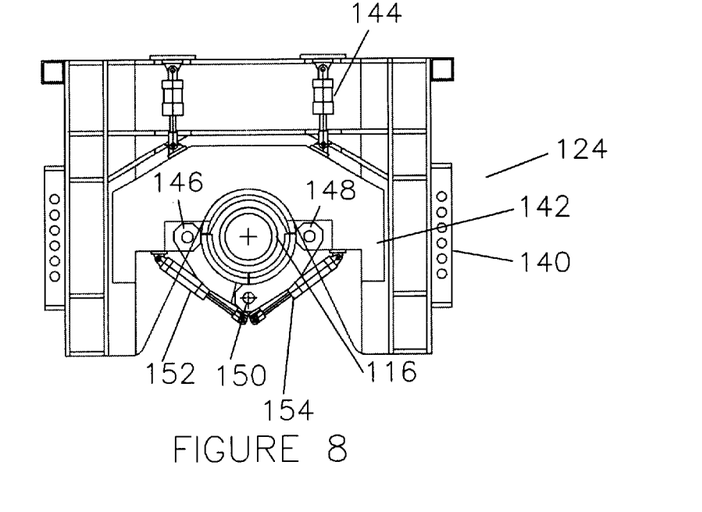
FIG. 8 shows a top view of the clamp assembly with the doors closed around a pipe section.

Referring now to FIG. 8, travelling table 124 is shown with holes 140 on each side for attaching the cables 126. A main clamp segment 142 is provided with cylinders 144 to move the main clamp segment toward or away from the pipeline. Clamp segments 146 and 148 wrap around the pipeline 116 and are connected with pin connection 150. Cylinders 152 and 154 are provided to open and close the clamp segments 146 and 148 when the pin connection 150 is unlocked.

Figure 9:
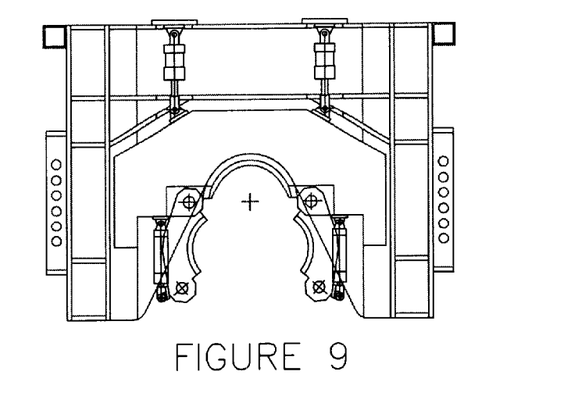
FIG. 9 is a top view of a clamp assembly of FIG. 8 in the traveling table of FIG. 7 with an open clamp.

Referring now to FIG. 9, the pin connection 150 is unlocked and the clamp segments 146 and 148 are opened.

Figure 10:
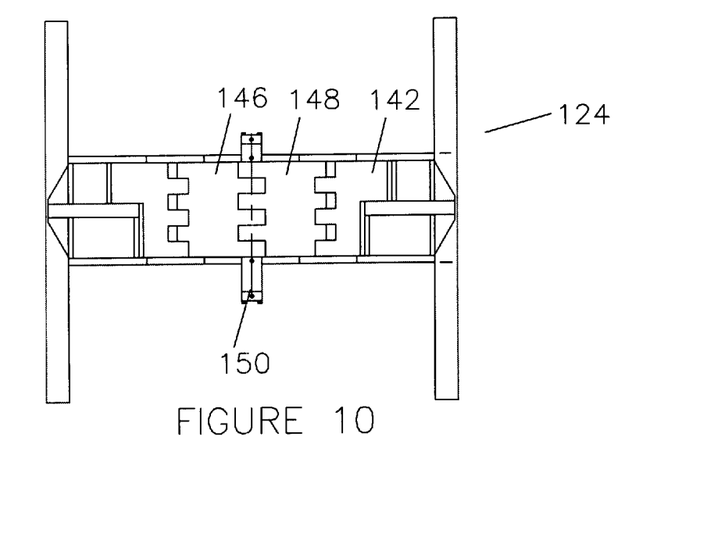
FIG. 10 shows the front view of the clamp assembly of FIG. 9 with the doors closed around the pipe section.

Referring now to FIG. 10, a front view of the traveling table is provided showing the clamp segments 142, 146, and 148 along with the pin connection 150.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A pin connection for the releasable attachment of two halves of a connection, comprising a first connection half and a second connection half each having one or more fingerlike projections, one or more of said fingerlike projections having one or more holes there thru and one or more of said holes having a locking pin section therein, said connection having a first locked position wherein said first and said second connection halves are located such that said fingerlike pins mesh together and said holes are in axial alignment and said locking pins are partially in the hole in one of said fingerlike projection in said first connection half and partially in one of said fingerlike projections in said second connection half, said connection having a second unlocked position wherein said first and said second connection halves are located such that said fingerlike pins mesh together and said holes are in axial alignment and said locking pins are centrally located in one of said holes in one of said fingerlike projections, and said connection having a third unlocked position wherein said first and said second connection halves are separated from one another and said locking pins are centrally located in one of said holes in one of said fingerlike projections, further comprising one or more of said locking pins having a slot parallel to their centerlines and one or more of said fingerlike projections having a stop pin means for engaging said slot such that when one end of said slot engages said stop pin said locking pin will be in said unlocked position and when the other end of said slot engages said stop pin said locking pin will be in said locked position.

2. The invention of claim 1, further comprising a recess in the end of said slot such that when the end of said slot is aligned with said stop pin said stop pin is resiliently loaded into said recess to urge said locking pin to remain in that position.

3. A pin connection for the releasable attachment of two halves of a connection, comprising a first connection half and a second connection half each having one or more fingerlike projections, one or more of said fingerlike projections having one or more holes there thru and one or more of said holes having a locking pin section therein, said connection having a first locked position wherein said first and said second connection halves are located such that said fingerlike pins mesh together and said holes are in axial alignment and said locking pins are partially in the hole in one of said fingerlike projection in said first connection half and partially in one of said fingerlike projections in said second connection half, said connection having a second unlocked position wherein said first and said second connection halves are located such that said fingerlike pins mesh together and said holes are in axial alignment and said locking pins are centrally located in one of said holes in one of said fingerlike projections, and said connection having a third unlocked position wherein said first and said second connection halves are separated from one another and said locking pins are centrally located in one of said holes in one of said fingerlike projections, further comprising a recess on one or more of said locking pins and a stop pin on said one or more fingerlike projections such that when said stop pin is aligned with said recess said stop pin is resiliently urged into said recess to urge said locking pin to remain in said position.

4. A pin connection for the releasable attachment of two halves of a connection, comprising a first connection half and a second connection half each having one or more fingerlike projections, one or more of said fingerlike projections having one or more holes there thru and one or more of said holes having a locking pin section therein, said connection having a first locked position wherein said first and said second connection halves are located such that said fingerlike pins mesh together and said holes are in axial alignment and said locking pins are partially in the hole in one of said fingerlike projection in said first connection half and partially in one of said fingerlike projections in said second connection half, said connection having a second unlocked position wherein said first and said second connection halves are located such that said fingerlike pins mesh together and said holes are in axial alignment and said locking pins are centrally located in one of said holes in one of said fingerlike projections, and said connection having a third unlocked position wherein said first and said second connection halves are separated from one another and said locking pins are centrally located in one of said holes in one of said fingerlike projections, further comprising a locking cylinder to move said locking pins to said locked position and an unlocking cylinder to move said locking pin to said unlocked position, further comprising said locking cylinder comprising resilient means to urge said locking cylinder and said locking pins to remain in said locked position.

5. The invention of claim 4, further comprising said resilient means being one or more springs.

6. A. The invention of claim 5, further comprising one or more of said locking pins having a slot parallel to their centerlines and one or more of said fingerlike projections having a stop pin means for engaging said slot such that when one end of said slot engages said stop pin said locking pin will be in said unlocked position and when the other end of said slot engages said stop pin said locking pin will be in said locked position.

7. A pin connection for the releasable attachment of two halves of a connection, comprising a first connection half and a second connection half each having one or more fingerlike projections, one or more of said fingerlike projections having one or more holes there thru and one or more of said holes having a locking pin section therein, said connection having a first locked position wherein said first and said second connection halves are located such that said fingerlike pins mesh together and said holes are in axial alignment and said locking pins are partially in the hole in one of said fingerlike projection in said first connection half and partially in one of said fingerlike projections in said second connection half, said connection having a second unlocked position wherein said first and said second connection halves are located such that said fingerlike pins mesh together and said holes are in axial alignment and said locking pins are centrally located in one of said holes in one of said fingerlike projections, said connection having a third unlocked position wherein said first and said second connection halves are separated from one another and said locking pins are centrally located in one of said holes in one of said fingerlike projections, and further comprising that the ends of each of said locking pins are adjacent to the end of another of said locking pins such that when the locking pin on one end is pushed from said locked position to unlocked position, all of said locking pins are pushed from said locked position to said unlocked position and when the locking pin on the opposite end is pushed from said unlocked position to said locked position all of said locking pins are pushed from said unlocked position to said locked position, further comprising one or more of said locking pins having a slot parallel to their centerlines and one or more of said fingerlike projections having a stop pin means for engaging said slot such that when one end of said slot engages said stop pin said locking pin will be in said unlocked position and when the other end of said slot engages said stop pin said locking pin will be in said locked position.

8. The invention of claim 7, further comprising a recess in the end of said slot such that when the end of said slot is aligned with said stop pin said stop pin is resiliently loaded into said recess to urge said locking pin to remain in that position.

9. A pin connection for the releasable attachment of two halves of a connection, comprising a first connection half and a second connection half each having one or more fingerlike projections, one or more of said fingerlike projections having one or more holes there thru and one or more of said holes having a locking pin section therein, said connection having a first locked position wherein said first and said second connection halves are located such that said fingerlike pins mesh together and said holes are in axial alignment and said locking pins are partially in the hole in one of said fingerlike projection in said first connection half and partially in one of said fingerlike projections in said second connection half, said connection having a second unlocked position wherein said first and said second connection halves are located such that said fingerlike pins mesh together and said holes are in axial alignment and said locking pins are centrally located in one of said holes in one of said fingerlike projections, said connection having a third unlocked position wherein said first and said second connection halves are separated from one another and said locking pins are centrally located in one of said holes in one of said fingerlike projections, and further comprising that the ends of each of said locking pins are adjacent to the end of another of said locking pins such that when the locking pin on one end is pushed from said locked position to unlocked position, all of said locking pins are pushed from said locked position to said unlocked position and when the locking pin on the opposite end is pushed from said unlocked position to said locked position all of said locking pins are pushed from said unlocked position to said locked position, further comprising a recess on one or more of said locking pins and a stop pin on said one or more fingerlike projections such that when said stop pin is aligned with said recess said stop pin is resiliently urged into said recess to urge said locking pin to remain in said position.

10. A pin connection for the releasable attachment of two halves of a connection, comprising a first connection half and a second connection half each having one or more fingerlike projections, one or more of said fingerlike projections having one or more holes there thru and one or more of said holes having a locking pin section therein, said connection having a first locked position wherein said first and said second connection halves are located such that said fingerlike pins mesh together and said holes are in axial alignment and said locking pins are partially in the hole in one of said fingerlike projection in said first connection half and partially in one of said fingerlike projections in said second connection half, said connection having a second unlocked position wherein said first and said second connection halves are located such that said fingerlike pins mesh together and said holes are in axial alignment and said locking pins are centrally located in one of said holes in one of said fingerlike projections, said connection having a third unlocked position wherein said first and said second connection halves are separated from one another and said locking pins are centrally located in one of said holes in one of said fingerlike projections, and further comprising that the ends of each of said locking pins are adjacent to the end of another of said locking pins such that when the locking pin on one end is pushed from said locked position to unlocked position, all of said locking pins are pushed from said locked position to said unlocked position and when the locking pin on the opposite end is pushed from said unlocked position to said locked position all of said locking pins are pushed from said unlocked position to said locked position, further comprising a locking cylinder to move said locking pins to said locked position and an unlocking cylinder to move said locking pin to said unlocked position, further comprising said locking cylinder comprising resilient means to urge said locking cylinder and said locking pins to remain in said locked position.

11. The invention of claim 10, further comprising said resilient means being one or more springs.

12. The invention of claim 11, further comprising one or more of said locking pins having a slot parallel to their centerlines and one or more of said fingerlike projections having a stop pin means for engaging said slot such that when one end of said slot engages said stop pin said locking pin will be in said unlocked position and when the other end of said slot engages said stop pin said locking pin will be in said locked position.

* * * * *